United States Patent
Hirata et al.

(10) Patent No.: US 8,274,248 B2
(45) Date of Patent: Sep. 25, 2012

(54) ROTATION SPEED DETECTION CIRCUIT AND MOTOR DRIVER APPARATUS HAVING THE SAME

(75) Inventors: Shigeru Hirata, Kyoto (JP); Yoshifumi Shigmogaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 421 days.

(21) Appl. No.: 12/696,199

(22) Filed: Jan. 29, 2010

(65) Prior Publication Data

US 2010/0195784 A1    Aug. 5, 2010

(30) Foreign Application Priority Data

Jan. 30, 2009   (JP) .................................. 2009-20132
Dec. 11, 2009   (JP) ................................ 2009-281340

(51) Int. Cl.
    H02P 6/00        (2006.01)
(52) U.S. Cl. ................... 318/400.14; 318/700; 318/268; 318/400.04; 323/283; 323/299
(58) Field of Classification Search ............. 318/400.14, 318/400.04, 700; 323/283, 299
    See application file for complete search history.

(56) References Cited

U.S. PATENT DOCUMENTS

| | | | | |
|---|---|---|---|---|
| 4,008,425 A | * | 2/1977 | Dickey | 318/799 |
| 5,229,693 A | * | 7/1993 | Futami et al. | 318/400.14 |
| 5,838,123 A | * | 11/1998 | Zhao | 318/400.14 |
| 7,564,207 B2 | * | 7/2009 | Fujimura | 318/432 |
| 7,567,047 B2 | * | 7/2009 | Rozman | 318/400.17 |

FOREIGN PATENT DOCUMENTS

| | | |
|---|---|---|
| JP | 2002-199778 | 7/2002 |
| JP | 2004-048951 | 2/2004 |
| JP | 2008-154385 | 7/2008 |

* cited by examiner

Primary Examiner — Rita Leykin
(74) Attorney, Agent, or Firm — Fish & Richardson P.C.

(57) ABSTRACT

A rotation speed detection circuit includes an internal clock generation portion which receives an input of a period signal whose period varies in accordance with rotation speed of a motor and generates an internal clock signal having a predetermined number of pulses in one period of the period signal, and an internal clock counter portion which counts the number of pulses of the internal clock signal for a predetermined period every one period of the period signal and delivers a count value thereof as a digital data signal.

19 Claims, 8 Drawing Sheets

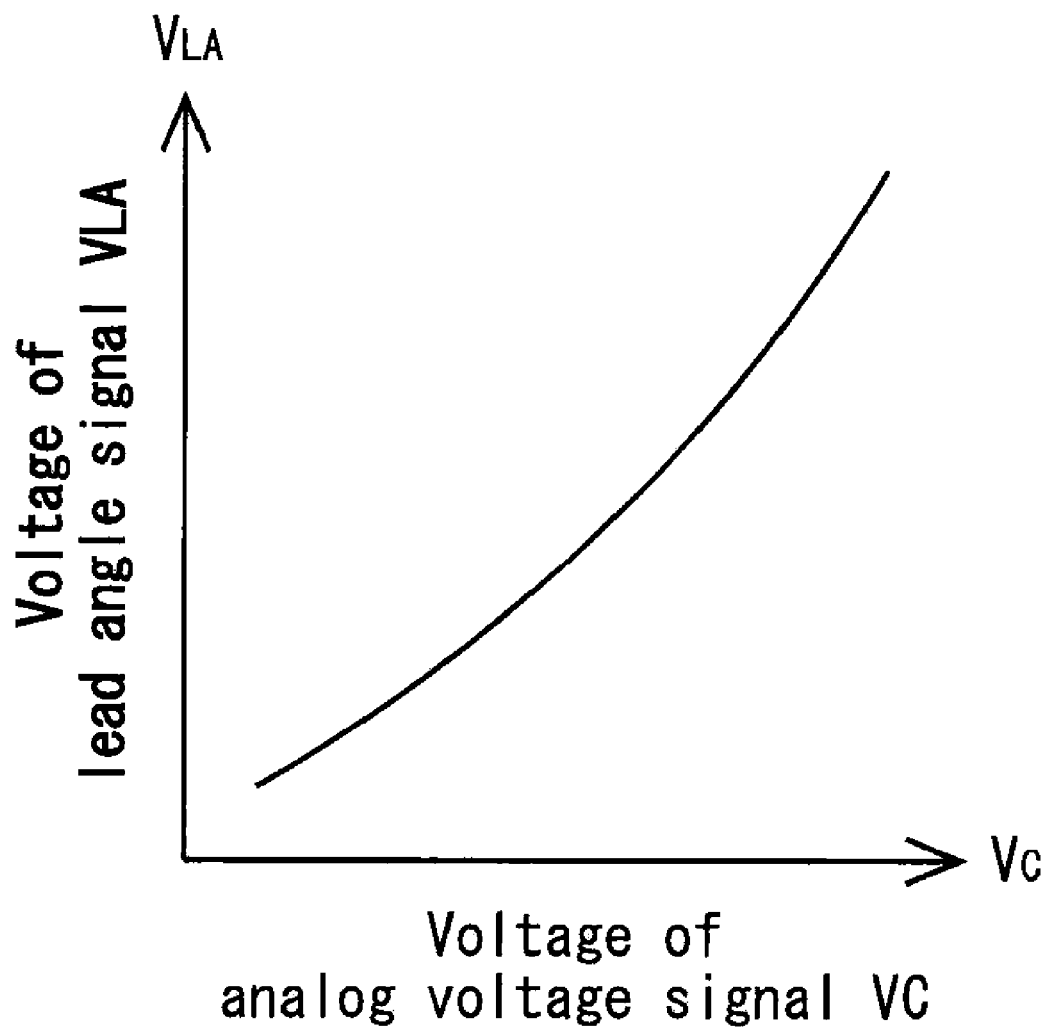

ROTATION SPEED DETECTION CIRCUIT AND MOTOR DRIVER APPARATUS HAVING THE SAME

CROSS-REFERENCE TO RELATED APPLICATIONS

This application is based on Japanese Patent Applications No. 2009-20132 filed on Jan. 30, 2009 and No. 2009-281340 filed on Dec. 11, 2009.

BACKGROUND OF THE INVENTION

1. Field of the Invention

The present invention relates to a rotation speed detection circuit of a motor for drive control of the motor and a motor driver apparatus (including a pre-driver) having the same, and particularly to a motor driver apparatus having a phase control function and a speed servo circuit.

2. Description of Related Art

In general, in drive control of a brushless motor or the like, a lag may occur in a phase of a drive signal and cause a decrease of drive efficiency in accordance with rotation speed of the motor. Therefore, control of increasing motor output torque (so-called lead angle control) is usually performed, in which a phase of the drive signal to be supplied to a motor coil is intentionally set to lead a phase of a Hall signal detected by a Hall sensor.

There are conventional methods of the lead angle control described in JP-A-2002-199778, JP-A-2004-48951 and JP-A-2008-154385, for example, in which a voltage generated in a resistor for sensing phase current is detected for controlling so that zero-cross timing of induction voltage (i.e., electromotive force) of a motor coil and a phase of the phase current are substantially equal to each other, or the voltage generated in the phase current sensing resistor is detected and smoothed for performing the lead angle control in proportion to the phase current.

However, these methods utilize the phase current sensing resistor. Therefore, they can easily be affected by switching noise and have other problems such as that stable control cannot be performed.

SUMMARY OF THE INVENTION

In view of the above-described problem, an object of the present invention is to provide a rotation speed detection circuit and a motor driver apparatus having the same, which can hardly be affected by a switching noise and can perform stable drive control in accordance with rotation speed of the motor without using a phase current sensing resistor.

A rotation speed detection circuit according to the present invention includes a internal clock generation portion for generating an internal clock signal n-$H_C$ having a predetermined number of pulses in one period of a period signal by receiving the period signal such as a Hall signal H or a FG signal FG having a period varying in accordance with rotation speed of a motor, and an internal clock counter portion for counting the number of pulses of the internal clock signal n-$H_C$ for a predetermined period every one period of the period signal so as to output the count value Cm as a digital data signal m-NC.

Note that other features, elements, steps, advantages and characteristics of the present invention will be apparent from the following detailed description of embodiments and the attached drawings.

BRIEF DESCRIPTION OF THE DRAWINGS

FIG. 2B is a graph showing a non-linear relationship between a voltage value of the analog voltage signal and a voltage value of the lead angle signal in the first embodiment.

DETAILED DESCRIPTION OF THE PREFERRED EMBODIMENTS

First, "lead angle control" in the present invention means phase control in which a phase of a drive control voltage is set in advance to lead by a phase corresponding to a phase difference between the drive control signal to be supplied to the motor generated in accordance with a rotation speed of the motor when the motor is driven and the drive signal in the motor coil so that the phase difference is corrected. The "lead angle" means the phase set to lead by the lead angle control.

First Embodiment

Figure 1:
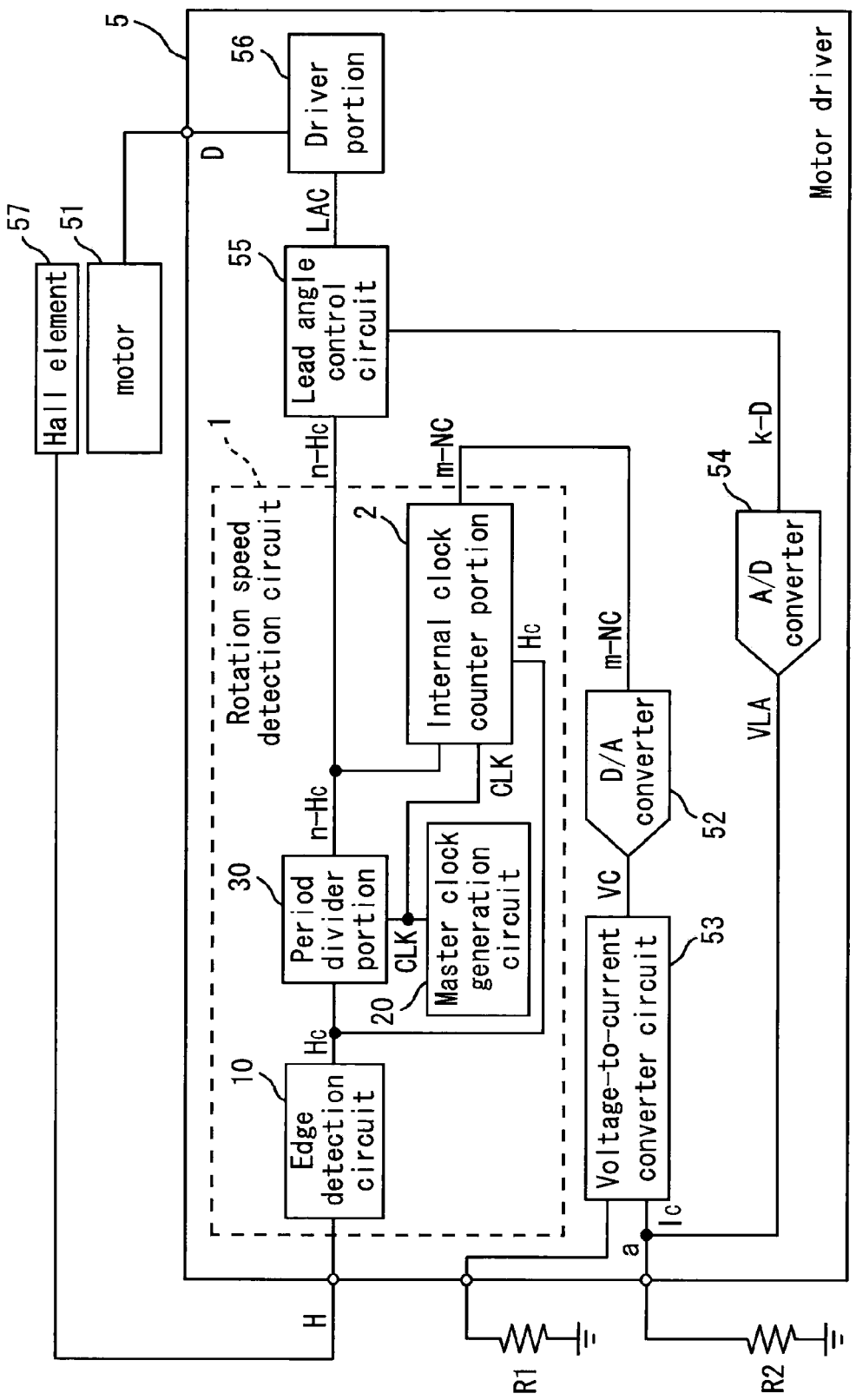
FIG. 1 is a block diagram illustrating a structure of a rotation speed detection circuit and a motor driver having the same according to a first embodiment.

FIG. 1 is a block diagram illustrating a structure of a rotation speed detection circuit and a motor driver having the same according to a first embodiment. As illustrated in FIG. 1, a motor driver 5 of the first embodiment is a semiconductor integrated circuit device for performing drive control of a motor 51. The motor driver 5 includes a rotation speed detection circuit 1, a D/A converter 52 for converting an L bit digital data signal m-NC output from the rotation speed detection circuit 1 into a first analog voltage signal VC having a first voltage value $V_C$, a voltage-to-current converter circuit 53 for converting the first analog voltage signal VC into an analog current signal $I_C$, an A/D converter 54 for converting a second analog voltage signal VLA having a second voltage value $V_{LA}$ based on the analog current signal $I_C$ into a second digital data signal k-D having k bits, a lead angle control circuit 55 for delivering a lead angle control signal LAC for performing lead angle control of the motor 51 based on the second digital data signal k-D and an internal clock signal n-$H_C$ that will be described later, and a driver portion 56 for performing lead angle control in accordance with the rotation speed of the motor 51 based on the lead angle control signal LAC and for delivering a drive signal D for driving the motor 51. The first analog voltage signal VC is applied to an end of a first resistance element (resistor R1) connected to the voltage-to-current converter circuit 53, so that the first analog voltage signal VC is converted into the analog current signal $I_C$. The analog current signal $I_C$ is supplied to an end of a second resistance element (resistor R2), so that a second analog voltage signal VLA is drawn out from the end of the second resistance element (resistor R2). The lead angle control circuit 55 generates the lead angle control signal LAC based on the internal clock signal n-$H_C$ and the second digital data signal k-D, determines the lead angle based on a Hall signal H supplied from a Hall element 57 via a Hall comparator (not shown in FIG. 1), and performs lead angle control of the motor 51 based on the determined lead angle. The Hall element 57 is a magnetic sensor which detects rotation speed of the motor 51 and delivers a Hall signal H having a period $T_H$ corresponding to the detected rotation speed in real time via a Hall comparator (not shown). Although the Hall element 57 is used as a sensor for detecting rotation speed of the motor 51 in this embodiment, this embodiment is not limited to this structure. Other sensor (e.g., an FG sensor such as an encoder) can be used, as long as it generates a signal having a period corresponding to rotation speed of the motor 51.

Rotation speed of the motor 51 can vary at any time, so the period $T_H$ of the Hall signal H supplied from the Hall element 57 via the Hall comparator (not shown) also varies at any time corresponding to the rotation speed of the motor 51 detected by the Hall element 57. In other words, a length of one period in each period of the Hall signal H can vary at any time corresponding to variation of the detected rotation speed. In addition, it is needless to say that the period $T_H$ of the Hall signal H has a relationship corresponding to the period of the drive signal D for driving the motor 51. In this embodiment, for easy understanding of structures and functions of the motor driver 5 and the rotation speed detection circuit 1, it is supposed that the period $T_H$ of the Hall signal H corresponds to the period of the drive signal D of the motor 51 in the following description. (In other words, in the following description, it is supposed that one of three phases of Hall signals HU, HV and HW is supplied to the rotation speed detection circuit 1 as the Hall signal H and that one period of the Hall signal H corresponds to a phase of 360 degrees of the drive signal D). Note that this embodiment is not limited to this limitation, and it is sufficient if the period $T_H$ of the Hall signal H and the drive signal D of the motor 51 (and the rotation speed of the motor 51) have a constant correspondence relationship. For instance, it is possible to generate a combination Hall signal from three phases of Hall signals HU, HV and HW and to supply the combination Hall signal as the Hall signal H to the rotation speed detection circuit 1. In other words, one period of the Hall signal H may correspond to ⅓ period, ⅙ period or the like of the drive signal D of the motor 51.

The rotation speed detection circuit 1 receives an input of the Hall signal H from the Hall element 57 via the Hall comparator (not shown) so as to detect rotation speed of the motor 51 every one period of the Hall signal H, and outputs a result of the detection as the L bit digital data signal m-NC. The rotation speed detection circuit 1 includes an edge detection circuit 10, a master clock generation circuit 20, a period divider portion 30, and an internal clock counter portion 2.

The edge detection circuit 10 generates a pulse signal corresponding to each period of the Hall signal H supplied from the Hall element 57 via the Hall comparator (not shown) (a pulse signal having pulses corresponding to detected leading edges of the Hall signal H in FIGS. 4 and 5 that will be referred to later) and output the same as an edge signal $H_C$. The edge signal $H_C$ has the same period as the Hall signal H.

The master clock generation circuit 20 is an oscillation circuit for generating a master clock signal CLK having frequency f for synchronizing with operation timing in the rotation speed detection circuit 1. In this embodiment, an oscillation circuit utilizing a general quartz resonator is used, but this is not a limitation.

The period divider portion 30 is a prescaler (divider) for generating the internal clock signal n-$H_C$ having a period $T_H/n$ that is obtained by dividing equally the period $T_H$ of the edge signal $H_C$ by a predetermined number n.

More specifically, the period divider portion 30 generates the internal clock signal n-$H_C$ constituted of n pulses having a period $T_H/n$ that is obtained by dividing equally the length of one period by n in each period of the edge signal $H_C$ based on the edge signal $H_C$ supplied from the edge detection circuit 10 and the master clock signal CLK supplied from the master clock generation circuit 20.

In other words, as described above, the length of the period $T_H$ of the edge signal $H_C$ can vary every one period corresponding to the rotation speed of the motor 51 detected by the Hall element 57, and therefore the period $T_H/n$ of the internal clock signal n-$H_C$ also varies corresponding to variation of the period $T_H$ of the edge signal $H_C$.

In addition, the period $T_H/n$ of the internal clock signal n-$H_C$ output from the period divider portion 30 corresponds to the period obtained by dividing equally one period of the drive signal D of the motor 51 (and a phase of 360 degrees) by n, i.e., a phase of 360/n degrees in the drive signal D of the motor 51. In this embodiment, the numerical range of values of n is not limited particularly. However, a phase to be controlled per unit in the lead angle control process is 360/n degrees. Therefore, if n=360, one degree can be a unit of phase control, which is very convenient and appropriate for performing lead angle control. In addition, if n is set to a multiple of 360, the lead angle control can be performed more precisely.

The internal clock counter portion 2 counts the number of pulses of the internal clock signal n-$H_C$ supplied during a unit time (m/f) in each period of the edge signal $H_C$ based on the edge signal $H_C$ supplied from the edge detection circuit 10, the master clock signal CLK supplied from the master clock generation circuit 20 and the internal clock signal n-$H_C$ supplied from the period divider portion 30, and outputs the digital data signal m-NC indicating the count value Cm.

The internal clock counter portion 2 counts the number of pulses of the master clock signal CLK supplied from the master clock generation circuit 20 until a predetermined m-th pulse in each period of the edge signal $H_C$ with a trigger signal that is the edge signal $H_C$ supplied from the edge detection circuit 10. In addition, the internal clock counter portion 2 counts the number of pulses of the internal clock signal n-$H_C$ supplied from the period divider portion 30 during the effective count time $T_E(\approx m/f)$ from the input of the edge signal $H_C$ until the input of the m-th pulse of the counted master clock signal CLK, and outputs the digital data signal m-NC indicating the count value Cm of the number of pulses of the internal clock signal n-$H_C$ supplied during the effective count time $T_E$ counted in each period of the edge signal $H_C$.

Here, as described above, the period $T_H/n$ of the internal clock signal n-$H_C$ corresponds to the phase of the drive signal D of the motor 51. Therefore, the number of pulses Cm of the internal clock signal n-$H_C$ supplied during the unit time (m/f) (i.e., Cm times the period of the internal clock signal n-$H_C$) is the phase of the drive signal D leading in the unit time (m/f), which corresponds to the rotation speed of the motor 51 per unit time (m/f). In this way, the L bit digital data signal m-NC delivered from the rotation speed detection circuit 1 indicates the detected rotation speed of the motor 51, and variation of the number of pulses Cm of the internal clock signal n-$H_C$ indicated by the L bit digital data signal m-NC corresponds to variation of the rotation speed of the motor 51.

Next, the D/A converter 52 delivers the analog voltage signal VC that is the result of digital-to-analog conversion of the L bit digital data signal m-NC output from the rotation speed detection circuit 1 (internal clock counter portion 2 thereof). Here, voltage of the analog voltage signal VC has a constant value corresponding to a value indicated by the digital data signal m-NC.

The voltage-to-current converter circuit 53 is a circuit for converting the analog voltage signal VC having a constant voltage value output from the D/A converter 52 into the analog current signal $I_C$ having a constant current value. In addition, the voltage-to-current converter circuit 53 is connected to an end of the resistor R1 disposed outside the motor driver 5 and an end of the resistor R2. The other end of the resistor R1 and the other end of the resistor R2 are connected to the ground. In addition, a node "a" between the voltage-to-current converter circuit 53 and the end of the resistor R2 is connected to an input side of the A/D converter 54. Therefore, the voltage-to-current converter circuit 53 is also connected to the A/D converter 54 via the node "a". Further, the voltage-to-current converter circuit 53 delivers the analog current signal $I_C$ indicating a constant current value based on the voltage value of the analog voltage signal VC and a resistance value of the resistor R1 to the node "a".

Here, since the node "a" is connected to the ground via the resistor R2, the analog current signal $I_C$ output from the voltage-to-current converter circuit 53 is actually converted to an analog signal having a constant voltage value based on a current value of the analog current signal $I_C$ and a resistance value of the resistor R2, and is supplied as a lead angle signal VLA to the A/D converter 54. Thus, in the motor driver 5 of this embodiment, in the voltage-to-current converter circuit 53, and between the voltage-to-current converter circuit 53 and the A/D converter 54, the voltage $V_C$ of the analog voltage signal VC is converted into the voltage $V_{LA}$ of the lead angle signal VLA and is supplied to the A/D converter 54.

With this structure, in the motor driver 5 of this embodiment, a relationship between the voltage value $V_C$ of the analog voltage signal VC and a conversion value thereof (voltage value $V_{LA}$ of the lead angle signal VLA) is determined based on a ratio of the resistance value of the resistor R1 to the resistance value of the resistor R2.

Figure 2A:
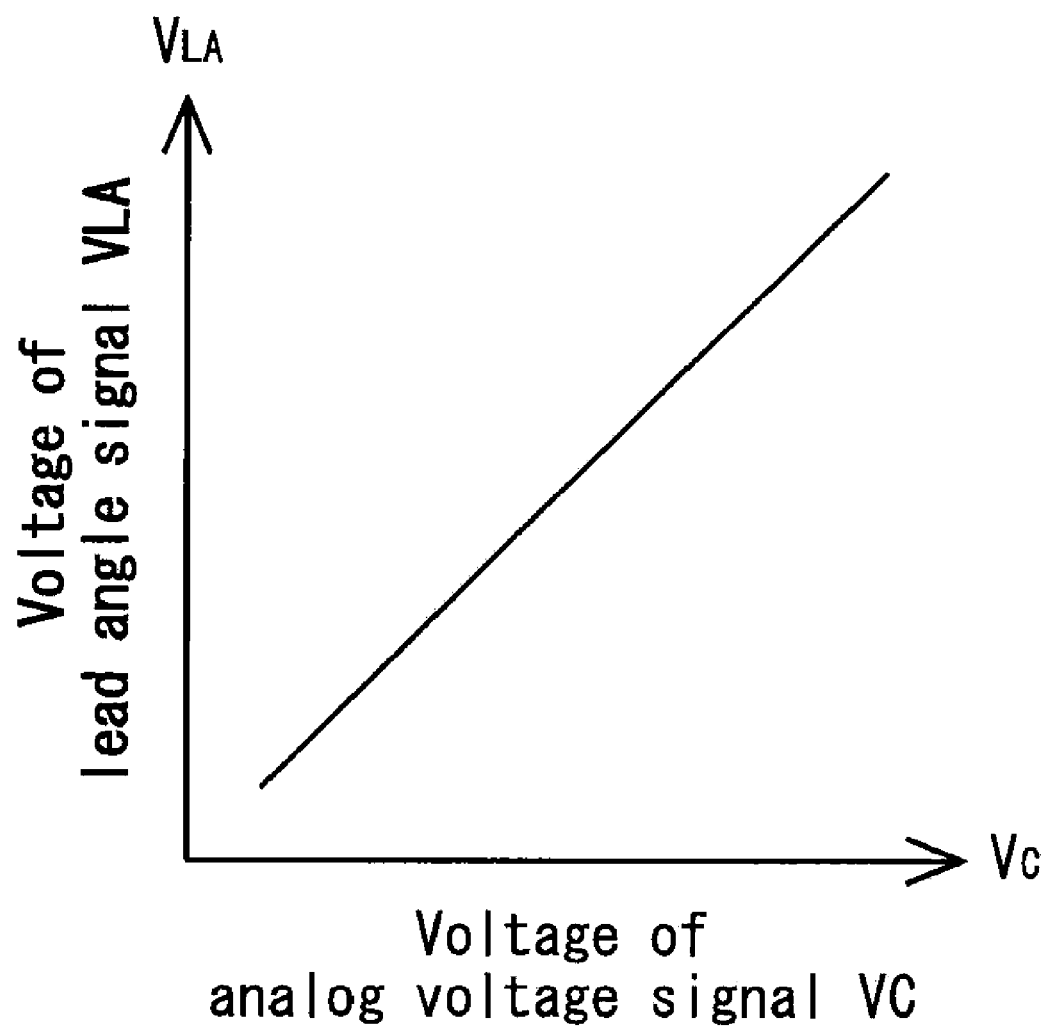
FIG. 2A is a graph showing a linear relationship between a voltage value of an analog voltage signal and a voltage value of a lead angle signal in the first embodiment.

FIGS. 2A and 2B are graphs indicating a relationship between the voltage value $V_C$ of the analog voltage signal VC and the voltage value $V_{LA}$ of the lead angle signal VLA in this embodiment. FIG. 2A is a graph in the case where the voltage value $V_{LA}$ of the lead angle signal VLA is converted linearly with respect to the voltage value $V_C$ of the analog voltage signal VC, and FIG. 2B is a graph in the case where the voltage value $V_{LA}$ of the lead angle signal VLA is converted non-linearly with respect to the voltage value $V_C$ of the analog voltage signal VC. In each case where the relationship between the voltage value $V_C$ of the analog voltage signal VC and the conversion value thereof (voltage value $V_{LA}$ of the lead angle signal VLA) is linear as illustrated in FIG. 2A or non-linear as illustrated in FIG. 2B, the relationship can be determined by a ratio R1/R2 of resistance values of the resistor R1 and R2. In the case of linear conversion as illustrated in FIG. 2A, the voltage value $V_{LA}$ of the lead angle signal VLA is proportional to the voltage value $V_C$ of the analog voltage signal VC, and the conversion rate thereof is expressed as a ratio $V_{LA}/V_C$ of the voltage value $V_{LA}$ of the lead angle signal VLA to the voltage value $V_C$ of the analog voltage signal VC. Here, the voltage value $V_C$ of the analog voltage signal VC corresponds to the detected rotation speed of the motor 51, and the voltage value $V_{LA}$ of the lead angle signal VLA corresponds to a value of the lead angle when the lead angle control is performed. Therefore, it can be said that FIGS. 2A and 2B show correlations between resolution of the lead angle that is set upon the lead angle control of the rotation speed of the motor 51 and the ratio R1/R2 of resistance values of resistors R1 and R2.

In addition, although not limited particularly in this embodiment, if the resistance values of the resistors R1 and R2 can be set individually in a variable manner, the relationship between the voltage $V_C$ of the analog voltage signal VC and the conversion value thereof (voltage $V_{LA}$ of the lead angle signal VLA) as illustrated in FIG. 2A or 2B can be set in a variable manner by setting the resistance values, which is convenient.

In other words, the motor driver 5 of this embodiment may have the structure, in which a resistance value of the first resistance element (resistor R1) and a resistance value of the second resistance element (resistor R2) are variable, and a relationship between the first voltage value $V_C$ of the first analog voltage signal VC and the second voltage value $V_{LA}$ of the second analog voltage signal VLA that is a conversion value thereof (lead angle signal) is determined based on a ratio of a resistance value of the first resistance element (resistor R1) to a resistance value of the second resistance element (resistor R2).

With this structure, in the motor driver 5 of this embodiment, in the process where the L bit digital data signal m-NC becomes the first analog voltage signal VC, the analog current signal $I_C$, and the second analog voltage signal VLA (lead angle signal), a relationship between the first voltage value $V_C$ and the conversion value thereof (second voltage value $V_{LA}$) can be determined by setting resistance values of the first resistance element (resistor R1) and the second resistance element (resistor R2) whose resistance values can be set in a variable manner. Therefore, resolution of the lead angle in the lead angle control can be more precise, so that the lead angle control of the motor can be performed accurately in a wide range of the rotation speed.

Next, with reference to FIG. 1 again, the A/D converter 54 performs analog-to-digital conversion of the lead angle signal VLA that is an analog constant voltage signal so as to output a k bit digital data signal k-D.

The lead angle control circuit 55 determines the lead angle that is set in the drive signal D for controlling the rotation speed of the motor 51 based on the k bit digital data signal k-D supplied from the A/D converter 54, and delivers the same as the lead angle control signal LAC to the driver portion 56. In addition, the lead angle control circuit 55 is supplied with the internal clock signal n-$H_C$ from the period divider portion 30 of the rotation speed detection circuit 1, so that the lead angle is determined with a unit quantity of a phase of 360/n degrees indicated by the period $T_H$/n of the internal clock signal n-$H_C$.

The driver portion 56 generates and outputs the drive signal D for controlling the rotation speed of the motor 51 including the lead angle control based on the lead angle control signal LAC from the lead angle control circuit 55.

In this way, the rotation speed detection circuit 1 and the motor driver 5 of this embodiment can generate the digital data signal k-D corresponding to the rotation speed of the motor 51 detected by the Hall element 57 without using a phase current sensing resistor and can perform variable control of the lead angle to be set in the lead angle control circuit 55 based on the generated digital data signal k-D. Therefore, it is possible to realize stable drive control in accordance with the rotation speed of the motor 51 with little influence of switching noise.

In addition, the rotation speed detection circuit 1 and the motor driver 5 of this embodiment performs lead angle control with the digital data signal m-NC based on the internal clock signal n-$H_C$ obtained by n-dividing the period $T_H$ of the Hall signal H supplied from the Hall element via the Hall comparator and the internal clock signal n-$H_C$. Therefore, resolution of the lead angle to be set can be precise in accordance with the phase (360/n degrees) indicated by the period $T_H$/n to be set, and the lead angle control of the motor can be performed more precisely.

In addition, among circuit blocks constituting the rotation speed detection circuit 1, the internal clock generation portion 3 for generating the internal clock signal n-$H_C$ having a predetermined number (e.g., 360) of pulses in one period of the Hall signal H (the edge detection circuit 10, the master clock generation circuit 20 and the period divider portion 30) can be constituted by using the current circuit block that is used for a conventional structure in which the lead angle is set in a fixed manner. Therefore, circuit blocks that should newly be added for realizing the above-described lead angle variable control are only the internal clock counter portion 2, the D/A converter 52 and the voltage-to-current converter circuit 53. Therefore, it is not necessary to make substantial engineering changes of the semiconductor integrated circuit device, so that unnecessary increase of cost and development term can be avoided.

In addition, the rotation speed detection circuit 1 and the motor driver 5 of this embodiment can use the phase of 360/n degrees indicated by the period $T_H$/n of the internal clock signal n-$H_C$ as a unit quantity of the lead angle (phase) in the lead angle control. Therefore, it is possible to perform the lead angle control having very precise resolution. For instance, supposing n=360 in this embodiment, the phase indicated by the period $T_H$/360 of the internal clock signal n-$H_C$ becomes one degree. In other words, the lead angle control of the motor 51 can be performed with a unit quantity of the lead angle that is one degree.

Although the period $T_H$ of the Hall signal H and the edge signal $H_C$ corresponds to the period of the drive signal D of the motor 51 in this embodiment, the period $T_H$ of the Hall signal H and the edge signal $H_C$ is actually smaller than the period of the drive signal D of the motor 51. In other words, one period of the Hall signal H corresponds to ⅓ period, ⅙ period or the like of the drive signal D of the motor 51 in many cases. In this case, the unit quantity of the lead angle (phase) in the lead angle control becomes smaller so that the resolution in the lead angle control can be more precise.

In addition, in the rotation speed detection circuit 1 and the motor driver 5 of this embodiment, the rotation speed of the motor 51 detected more accurately with more precise resolution can be obtained as the L bit digital data signal m-NC. Therefore, more accurate lead angle control with very precise resolution can be performed. In addition, in the process of converting the L bit digital data signal m-NC into the k bit digital data signal k-D, a gain of the lead angle set in the lead angle control with respect to the L bit digital data signal m-NC can be adjusted by setting the resistance values of the first resistance element (resistor R1) and the second resistance element (resistor R2) and/or by setting resistance values thereof in a variable manner. Therefore, a range of the resolution of the lead angle control can also be set.

Figure 3:
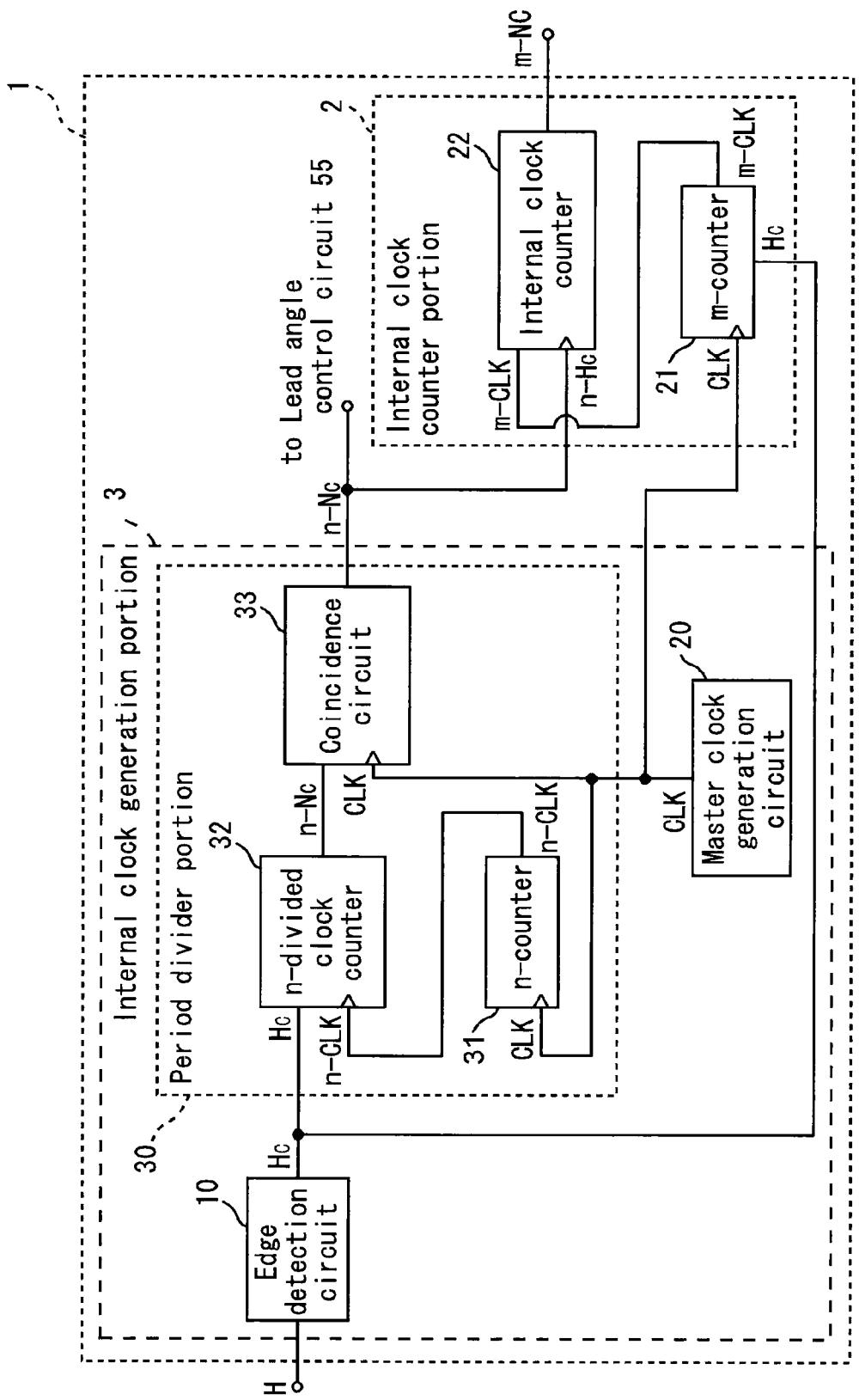
FIG. 3 is a block diagram illustrating a more detailed structure of the rotation speed detection circuit in the first embodiment.

Next, the structure of the rotation speed detection circuit 1 according to this embodiment will be described in more detail. FIG. 3 is a block diagram illustrating a structure of the rotation speed detection circuit according to the first embodiment.

The rotation speed detection circuit 1 includes the internal clock generation portion 3 (the edge detection circuit 10, the master clock generation circuit 20, and the period divider portion 30 in FIG. 3) which receives an input of the period signal (Hall signal H in FIG. 3) whose period varies in accordance with the rotation speed of the motor 51 so as to generate an internal clock signal (n-$H_C$ in FIG. 3) having a predetermined number of pulses in one period of the period signal, and an internal clock counter portion 2 which counts the number of pulses of the internal clock signal n-$H_C$ for a predetermined period every one period of the period signal so as to output the count value as the digital data signal m-NC.

The above-described internal clock generation portion 3 includes the edge detection circuit 10 for generating the pulse signal corresponding to each period of the input Hall signal H so as to deliver the same as the edge signal $H_C$, the master clock generation circuit 20 for generating the master clock signal CLK having a constant frequency f, and the period divider portion 30 for generating the internal clock signal n-$H_C$ having n pulses in which one period is the time obtained by dividing equally one period of the edge signal $H_C$ supplied from the edge detection circuit 10 by the predetermined number n in each period of the edge signal $H_C$ based on the master clock signal CLK.

In addition, the period divider portion 30 includes an n-counter 31 which counts the number of pulses of the master clock signal CLK supplied from the master clock generation circuit 20 by unit of n and deliver only the n-th pulse as an n-divided clock signal n-CLK (in other words, an n-counter 31 which counts the number of pulses of the master clock signal CLK, and every time when the count value thereof becomes "n", generates the n-divided clock signal n-CLK by only one pulse and resets the count value), an n-divided clock counter 32 which delivers an n-count signal n-NC indicating the number of pulses Cn of the n-divided clock signal n-CLK supplied from the n-counter 31 that is counted in one period for one period of the edge signal $H_C$ (in other words, an n-divided clock counter 32 which counts the n-divided clock signal n-CLK, updates an output value of the count signal n-NC indicating the count value Cn thereof with a trigger that is a trailing edge of the edge signal $H_C$, resets the count value Cn, and restarts the counting), and a coincidence circuit 33 which delivers the internal clock signal n-$H_C$ that is an every Cn-th pulse of the master clock signal CLK supplied from the master clock generation circuit 20 (in other words, a coincidence circuit 33 which counts the number of pulses of the master clock signal CLK, and every time when the count value thereof becomes "Cn", generates the internal clock signal n-$H_C$ by only one pulse, and resets the count value). Based on the master clock signal CLK, the period divider portion 30 generates the internal clock signal n-$H_C$ having n pulses in which one period is the time $T_H$/n obtained by dividing the length of one period of the edge signal $H_C$ supplied from the edge detection circuit 10 by n, for each one period of the edge signal $H_C$.

In addition, the internal clock counter portion 2 includes an m-counter 21 which counts the number of pulses of the master clock signal CLK with a trigger signal that is an input of the edge signal $H_C$, in each period of the edge signal $H_C$ and delivers an m-gate signal m-CLK, with the edge signal $H_C$ as a first gate pulse GP1 and the m-th pulse of the counted master clock signal CLK as a second gate pulse GP2, in each period of the edge signal $H_C$, an internal clock counter 22 which counts the number of pulses of the internal clock signal n-$H_C$ supplied in the effective count time $T_E$ from input of the first gate pulse of the m-gate signal m-CLK from the m-counter 21 to the input of the second gate pulse, in each period of the edge signal $H_C$ and delivers the result as a digital data signal m-NC. In each period of the edge signal $H_C$, the internal clock counter portion 2 counts the number of pulses of the master clock signal CLK supplied from the master clock generation circuit 20 with a trigger signal that is the edge signal $H_C$ supplied from the edge detection circuit 10, counts the number of pulses of the internal clock signal n-$H_C$ supplied from the period divider portion 30 in the effective count time $T_E$ from the input of the edge signal $H_C$ to the input of a predetermined m-th pulse of the master clock signal CLK, and delivers the result as the digital data signal m-NC.

An operation of the motor driver 5 of this embodiment will be described in detail with reference to a time chart. FIG. 4 is a timing chart showing an operation of the rotation speed detection circuit 1 of the first embodiment with respect to the Hall signal H of the period $T_H$. From the upper side, there are a Hall signal H output from the Hall element 57 via the Hall comparator, the edge signal $H_C$ output from the edge detection circuit 10, the n-divided clock signal n-CLK output from the n-counter 31, the count value Cn of the n-count signal n-NC output from the n-divided clock counter 32, the internal clock signal n-$H_C$ output from the coincidence circuit 33, the m-gate signal m-CLK output from the m-counter 21, and the digital data signal m-NC output from the internal clock counter 22.

Figure 4:
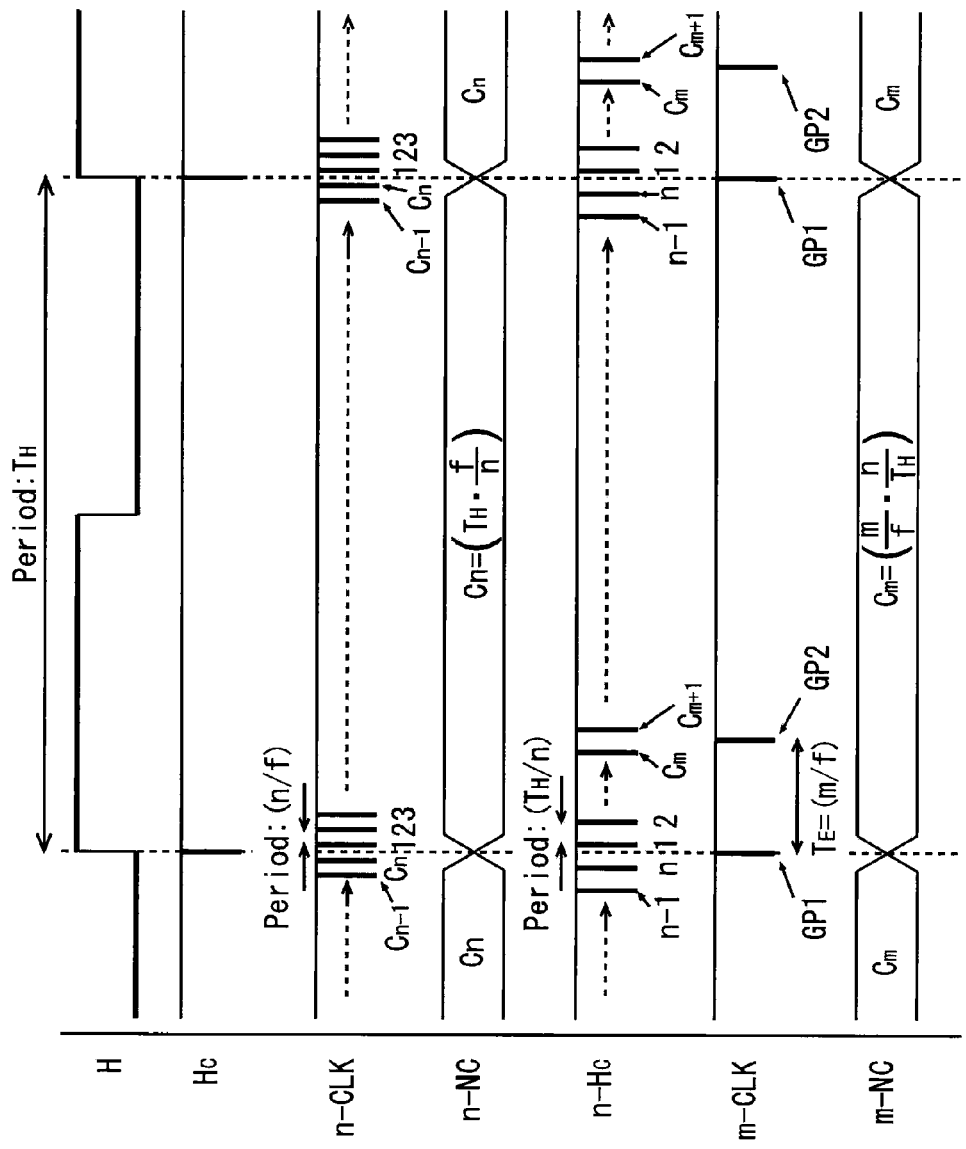
FIG. 4 is a timing chart illustrating an operation of a rotation speed detection circuit with respect to a Hall signal of a period $T_H$ in the first embodiment.

The edge detection circuit 10 receives the input of the Hall signal H having a period corresponding to the rotation speed of the motor 51 from the Hall element 57 (via the Hall comparator), generates the pulse signal corresponding to the period $T_H$ of the Hall signal H as illustrated in FIG. 4, and delivers the same as the edge signal $H_C$. The edge signal $H_C$ corresponds to the leading edge of the Hall signal H and has the same period $T_H$ as the Hall signal H. Although the edge signal $H_C$ corresponds to the leading edge of the Hall signal H in this embodiment, it may correspond to the trailing edge of the same. In addition, it may correspond to each of the leading edge and the trailing edge. In this case, rotation speed of the motor 51 can be detected every half period of the Hall signal H, so that the lead angle control can be performed more precisely.

The master clock generation circuit 20 generates the master clock signal CLK having the frequency f for synchronization of operation timing in the rotation speed detection circuit 1. In this embodiment, the master clock signal CLK is used in the n-counter 31, the coincidence circuit 33 and the m-counter 21.

The n-counter 31 counts pulses of the master clock signal CLK supplied from the master clock generation circuit 20 by unit of n, generates the pulse signal in synchronization with each n-th pulse of the master clock signal CLK, and delivers the same as the n-divided clock signal n-CLK. As illustrated in FIG. 4, the n-divided clock signal n-CLK has a period n/f.

Although not limited particularly in this embodiment, it is possible to adopt a structure in which the n-counter 31 is supplied with the edge signal $H_C$ from the edge detection circuit 10, and pulses of the master clock signal CLK are counted by unit of n with a trigger signal of the edge signal $H_C$. Since the count process is started with the edge signal $H_C$ as the trigger signal, the n-divided clock signal n-CLK and the edge signal $H_C$ can be synchronized with each other. Therefore, the internal clock signal n-$H_C$ can be generated more accurately by dividing the period $T_H$ of the edge signal $H_C$ by n.

The n-divided clock counter 32 counts the number of pulses of the n-divided clock signal n-CLK supplied from the n-counter 31 in each one period for each one period of the edge signal $H_C$ supplied from the edge detection circuit 10 and delivers the signal indicating the count value Cn as the n-count signal n-NC as illustrated in FIG. 4.

The coincidence circuit 33 is a logic circuit for comparing the master clock signal CLK supplied from the master clock generation circuit 20 with the n-count signal n-NC supplied from the n-divided clock counter 32 so as to decide true or false. If both are true, the pulse is generated and is output as the internal clock signal n-$H_C$. As illustrated in FIG. 4, the internal clock signal n-$H_C$ has a period $T_H/n$, which is obtained by dividing the period $T_H$ of the Hall signal H by n.

Although the logic circuit is used as the coincidence circuit 33 in this embodiment, it is possible to adopt a structure in which the number of pulses of the master clock signal CLK is count by unit of Cn indicated by the n-count signal n-NC with a trigger signal of the edge signal $H_C$, and the pulse signal in synchronization with the Cn-th pulse of the master clock signal CLK is generated and delivered as the internal clock signal n-$H_C$.

Next, the m-counter 21 counts the number of pulses of the master clock signal CLK supplied from the master clock generation circuit 20 for each one period of the edge signal $H_C$ with a trigger signal of the edge signal $H_C$ supplied from the edge detection circuit 10, and generates the pulse signal in synchronization with the counted m-th pulse. Further, as illustrated in FIG. 4, the m-counter 21 combines the edge signal $H_C$ as the first gate pulse GP1 with the pulse signal in synchronization with the generated m-th pulse as the second gate pulse GP2 so as to generate and deliver the m-gate signal m-CLK constituted of the first gate pulse GP1 and the second gate pulse GP2. Note that the m-counter 21 finishes the count process after counting the m-th pulse of the master clock signal CLK and does not perform counting until the next trigger signal (i.e., the next edge signal $H_C$) is supplied.

In other words, the m-counter 21 generates the first gate pulse GP1 in the m-gate signal m-CLK with a trigger of the trailing edge of the edge signal $H_C$ and resets its count value so as to start count of the number of pulses of the master clock signal CLK. When the count value reaches "m", the second gate pulse GP2 is generated in the m-gate signal m-CLK, and the count is stopped.

The m-gate signal m-CLK has the same period $T_H$ as the period signal H, and the first gate pulse GP1 is apart from the second gate pulse GP2 by time m/f in each period.

The internal clock counter 22 counts the number of pulses of the internal clock signal n-$H_C$ supplied from the coincidence circuit 33 in the period from the input of the first gate pulse GP1 until the input of the second gate pulse GP2 (effective count time $T_E$=m/f) for each one period of the count edge signal $H_C$ and stores the count value in a storage portion (not shown) such as a register. Then, the internal clock counter 22 delivers the L bit digital data signal m-NC indicating the count value Cm as illustrated in FIG. 4.

First, the internal clock counter 22 resets the internal clock counter 22 and the storage portion (not shown) such as a register with a trigger signal of the first gate pulse GP1 of the m-gate signal m-CLK supplied from the m-counter 21 and starts counting the number of pulses of the internal clock signal n-$H_C$ supplied from the coincidence circuit 33.

Next, the internal clock counter 22 finishes to count the number of pulses of the supplied internal clock signal n-$H_C$ with a trigger signal of the second gate pulse GP2 of the m-gate signal m-CLK and stores and holds the count value Cm in a storage portion (not shown) such as a register.

When the next first gate pulse GP1 is supplied, the internal clock counter 22 reads the count value Cm held in the storage portion (not shown) such as a register, and delivers the same as the L bit digital data signal m-NC. Further, the internal clock counter 22 resets the internal clock counter 22 and the storage portion (not shown) such as a register, so as to start to count the number of pulses of the internal clock signal n-$H_C$ that is supplied again.

In this way, the internal clock counter 22 uses the first gate pulse GP1 of the m-gate signal m-CLK supplied from the m-counter 21 is used in each period of the edge signal $H_C$ as a trigger signal for delivering the L bit digital data signal m-NC indicating the count value Cm read from the storage portion (not shown) such as a register, for resetting the internal clock counter 22 and the data held in the storage portion (not shown) such as a register, and for starting to count the number of pulses of the internal clock signal n-$H_C$ supplied from the coincidence circuit 33.

In addition, the second gate pulse GP2 is used as a trigger signal for finishing to count the number of pulses of the internal clock signal n-$H_C$ supplied from the coincidence circuit 33 and for storing and holding the count value Cm in a storage portion (not shown) such as a register.

Further, the count value Cm in each period of the edge signal $H_C$ is always delivered as the L bit digital data signal m-NC in the next period of the count period. Note that the internal clock counter 22 is supplied with the internal clock signal n-$H_C$ also after finishing the count process responding to the input of the second gate pulse GP2. Adopting the structure in which the internal clock counter 22 does not perform the count process of the number of pulses of the supplied internal clock signal n-$H_C$ until the next first gate pulse GP1 is supplied, it is possible to obtain the effect of reducing power consumption.

In this way, the rotation speed detection circuit 1 can detect rotation speed of the motor with the Hall element, the FG sensor or the like without using a phase current sensing resistor, and deliver a result of the detection as the digital data signal m-NC every one period of the period signal. Therefore, it is possible to deliver the stable digital data signal m-NC in accordance with the detection result of the rotation speed of the motor with little influence of switching noise.

In addition, the digital data signal m-NC delivered from the rotation speed detection circuit 1 indicates the count value Cm of the number of pulses of the internal clock signal n-$H_C$ generated in the period (effective count time $T_E$) from the generation of the edge signal $H_C$ until the generation of the predetermined m-th pulse of the master clock signal CLK for each one period of the period signal such as the Hall signal H or the FG signal FG. Therefore, resolution of the motor rotation speed indicated by the output digital data signal m-NC can be precise in accordance with the phase of 360/n degrees indicated by the period $T_H$/n of the internal clock signal n-$H_C$ corresponding to the period $T_H$ of the period signal. Thus, rotation speed of the motor can be detected more accurately.

In addition, in the rotation speed detection circuit 1, the current circuit block that is used for a conventional structure can be used as the internal clock generation portion 3 (the edge detection circuit 10, the master clock generation circuit 20 and the period divider portion 30). Therefore, circuit blocks that should newly be added is only the internal clock counter portion 2 (the m-counter 21 and the internal clock counter 22). Therefore, it is not necessary to make substantial engineering changes of the semiconductor integrated circuit device, so that unnecessary increase of cost and development term can be avoided.

Next, for better understanding of detailed operation of the rotation speed detection circuit 1 of this embodiment, the case where the period of the Hall signal H is changed will be described. FIG. 5 is a timing chart illustrating an operation of the rotation speed detection circuit 1 of the first embodiment with respect to the Hall signal H having a period $T_H$/2. From the upper side, there are a Hall signal H output from the Hall element 57 via the Hall comparator, the edge signal $H_C$ output from the edge detection circuit 10, the n-divided clock signal n-CLK output from the n-counter 31, the count value Cn of the n-count signal n-NC output from the n-divided clock counter 32, the m-gate signal m-CLK output from the m-counter 21, and the digital data signal m-NC output from the internal clock counter 22.

Figure 5:
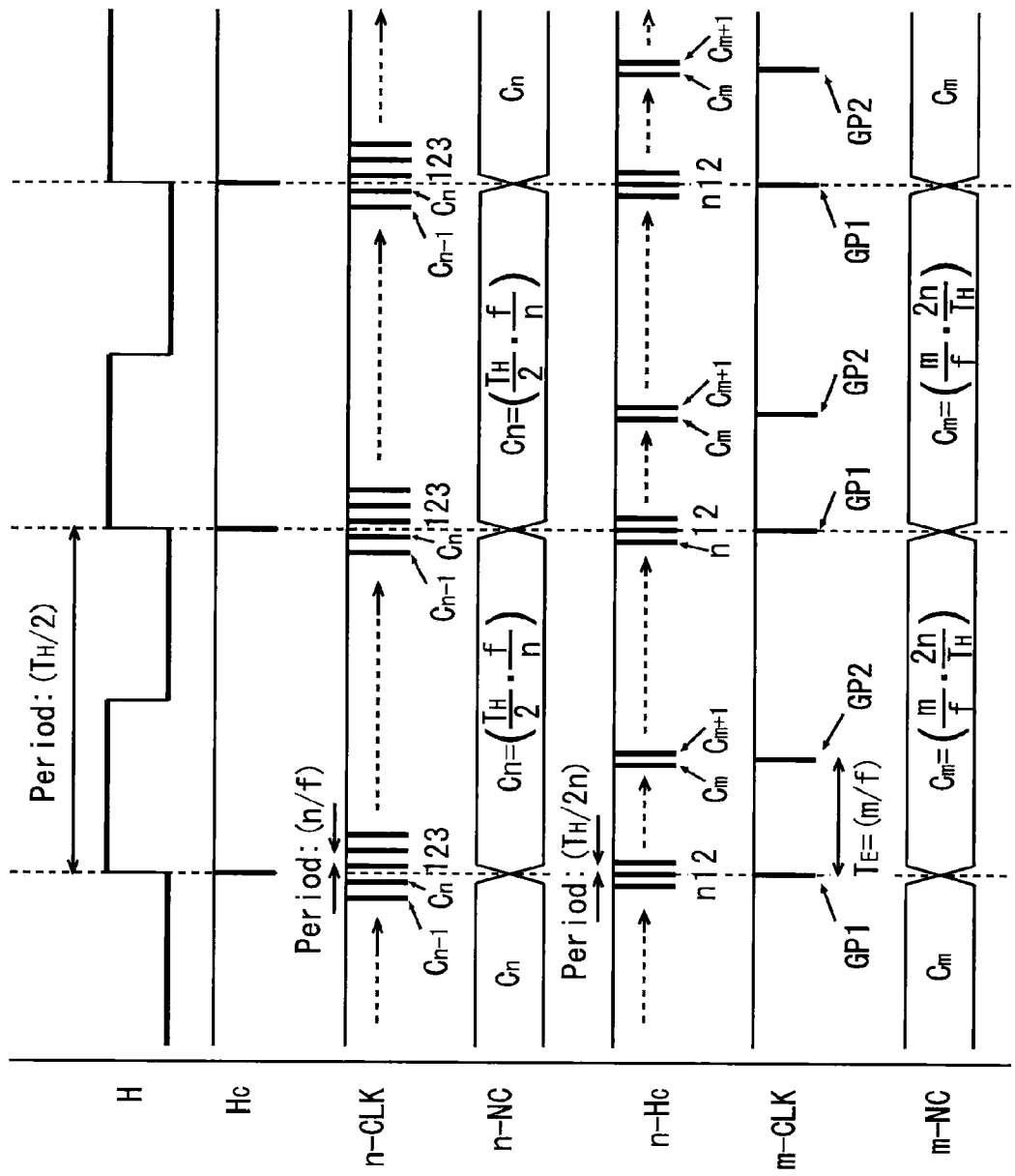
FIG. 5 is a timing chart illustrating an operation of the rotation speed detection circuit with respect to a Hall signal of a period $T_H/2$ in the first embodiment.

The edge detection circuit 10 detects the leading edge of the Hall signal H having the period $T_H$/2 as illustrated in FIG. 5 and delivers the edge signal $H_C$ having the same period $T_H$/2 as the Hall signal H as illustrated in FIG. 5.

The n-counter 31 outputs the n-divided clock signal n-CLK having the period n/f without being affected by the variation of period of the Hall signal H as illustrated in FIG. 5.

The n-divided clock counter 32 delivers the count value Cn of the n-divided clock signal n-CLK supplied in each period of the edge signal $H_C$ having the same period $T_H$/2 as the internal clock signal n-$H_C$ as illustrated in FIG. 5. In the case of FIG. 5, the period of the Hall signal H varies from $T_H$ to $T_H$/2, so the count value Cn also becomes a half value compared with the case where the period of the Hall signal H is $T_H$.

The coincidence circuit 33 compares the master clock signal CLK with the internal clock signal n-$H_C$ so as to decide true or false. If both are true, the pulse is generated and is output as the internal clock signal n-$H_C$ having the period $T_H$/2n as illustrated in FIG. 5. In other words, the internal clock signal n-$H_C$ has the period that is obtained by dividing the period $T_H$/2 of the Hall signal H by n.

As illustrated in FIG. 5, the m-counter 21 delivers the n-divided clock signal n-CLK that is constituted of the first gate pulse GP1 and the second gate pulse GP2, which are apart from each other by the effective count time $T_E$(=m/f).

As illustrated in FIG. 5, the internal clock counter 22 delivers the L bit digital data signal m-NC indicating the count value Cm of the number of pulses of the internal clock signal n-$H_C$ supplied from the coincidence circuit 33 in the effective count time $T_E$(=m/f). In the case of FIG. 5, the period of the Hall signal H varies from $T_H$ to $T_H$/2. Therefore, the count value Cm becomes twice the value when the period of the Hall signal H is $T_H$.

In this way, the rotation speed detection circuit 1 delivers the L bit digital data signal m-NC indicating the value corresponding linearly to the variation of the period of the Hall signal H. When α denotes a variation ratio of the period of the Hall signal H, the delivered L bit digital data signal m-NC indicates Cm=(m/f)·(αn/$T_H$).

Second Embodiment

In a motor driver 5' of a second embodiment, set and control of the lead angle value is performed directly by the L bit digital data signal m-NC output from the rotation speed detection circuit 1. Note that an element having the same structure as that in the first embodiment is denoted by the same numeral or symbol, and description thereof will be omitted.

Figure 6:
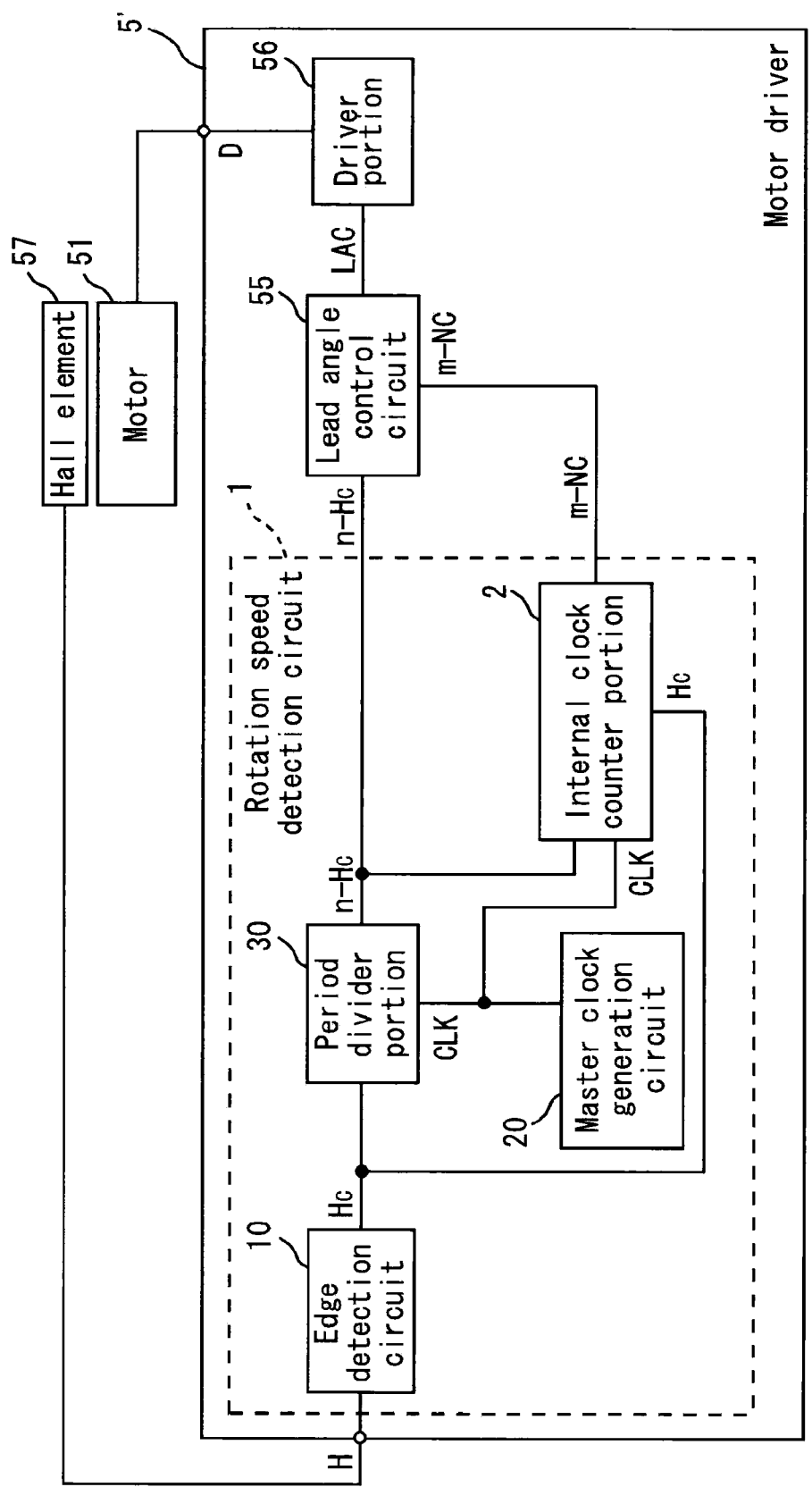
FIG. 6 is a block diagram illustrating a structure of a rotation speed detection circuit and a motor driver having the same according to a second embodiment.

FIG. 6 is a block diagram illustrating a structure of a rotation speed detection circuit and a motor driver having the same according to the second embodiment. As illustrated in FIG. 6, the motor driver 5' of the second embodiment is a semiconductor integrated circuit device for performing drive control of the motor 51. The motor driver 5' includes the rotation speed detection circuit 1, the lead angle control circuit 55 for delivering the lead angle control signal for performing lead angle control of the motor based on the digital data signal and the internal clock signal, and the driver portion 56 for performing the lead angle control of the motor in accordance with the rotation speed based on the lead angle control signal and for delivering the drive signal for driving the motor. The lead angle is determined based on the Hall signal H delivered from the Hall element 57 via the Hall comparator (not shown), and the lead angle control of the motor 51 is performed by the determined lead angle. It is needless to say that structures and functions (operations) of the rotation speed detection circuit 1 and its structural portions are the same as those of the first embodiments. In addition, the Hall element 57 is used as a sensor for detecting the rotation speed of the motor 51 in this embodiment, but this embodiment is not limited to this. It is possible to use other sensor (e.g., an FG sensor such as an encoder) as long as it generates the signal having the period corresponding to the detected rotation speed of the motor 51.

In this way, the motor driver 5' of the second embodiment can generate the digital data signal m-NC corresponding to the rotation speed of the motor 51 detected by the Hall element 57 without using a phase current sensing resistor and can perform variable control of the lead angle to be set in the lead angle control circuit 55 based on the generated digital data signal m-NC. Therefore, it is possible to realize the stable drive control in accordance with the rotation speed of the motor 51 without a little influence of the switching noise.

In addition, the motor driver 5' of this embodiment performs the lead angle control by the digital data signal m-NC based on the internal clock signal n-$H_C$ obtained by dividing the period $T_H$ of the Hall signal H supplied from the Hall element 57 via the Hall comparator (not shown in FIG. 6) by n and the internal clock signal n-$H_C$. Therefore, resolution of the set lead angle can be precise corresponding to the phase (360/n degrees) indicated by the period $T_H/n$, and the lead angle control of the motor 51 can be performed more accurately.

In addition, in the motor driver 5' of this embodiment, it is possible to use the current circuit block that is used for a conventional structure as the internal clock generation portion (the edge detection circuit, the master clock generation circuit, and the period divider portion), so the circuit blocks that should newly be added is only the internal clock counter portion (the m-counter and the internal clock counter). Therefore, it is not necessary to make substantial engineering changes of the semiconductor integrated circuit device, so that unnecessary increase of cost and development term can be avoided.

Further, the motor driver 5' of this embodiment performs the lead angle control of the motor 51 directly by the L bit digital data signal m-NC delivered from the rotation speed detection circuit 1. Therefore, the structure of the motor driver 5' can more be simplified.

Next, although the first and the second embodiment have the structure in which the rotation speed detection circuit 1 of the present invention is used for another motor driver, but it can also be used for speed control of a motor driver with speed servo (rotation speed control of the motor).

Third Embodiment

Figure 7:
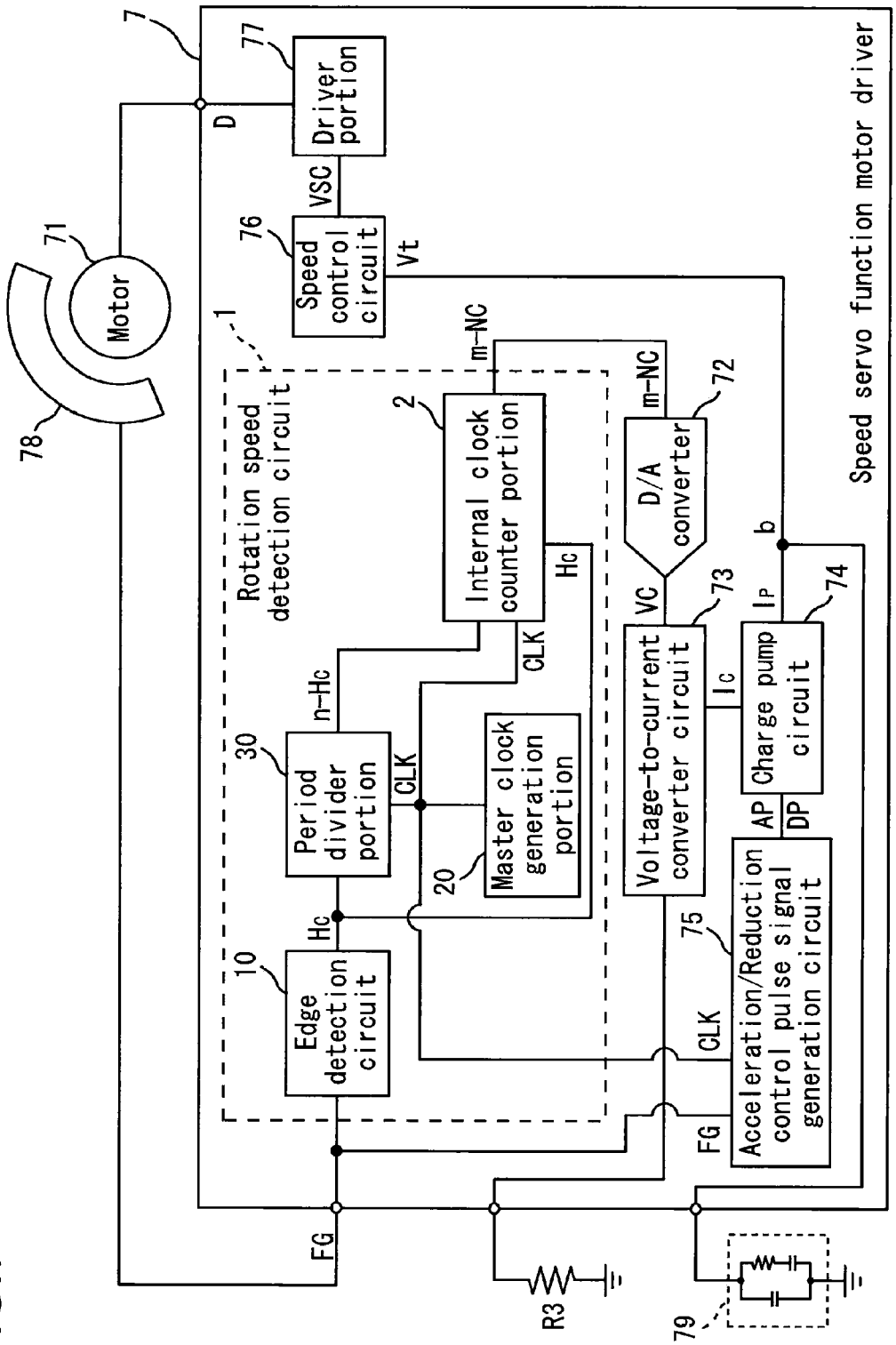
FIG. 7 is a block diagram illustrating a structure of a rotation speed detection circuit and a motor driver having the same with a speed servo function according to a third embodiment.

FIG. 7 is a block diagram illustrating structures of a rotation speed detection circuit and a speed servo function motor driver having the same according to a third embodiment. Note that the element having the same structure as that of the first embodiment is denoted by the same numeral or symbol in the following description.

As illustrated in FIG. 7, a speed servo function motor driver 7 is a semiconductor integrated circuit device for performing drive control of a motor 71 and includes the rotation speed detection circuit 1, a D/A converter 72 which converts the digital data signal m-NC delivered from the rotation speed detection circuit 1 into the analog voltage signal VC, a voltage-to-current converter circuit 73 which converts the analog voltage signal VC into the analog current signal $I_C$, an acceleration/reduction control pulse signal generation circuit 75 which generates an acceleration control pulse signal AP and a reduction control pulse signal DP so that actual rotation speed of the motor 71 agrees with target rotation speed based on the period signal, a charge pump circuit 74 which generates charge/discharge pulse current $I_P$ corresponding to the analog current signal $I_C$ based on the acceleration control pulse signal AP and the reduction control pulse signal DP, a speed control circuit 76 which delivers a speed control signal VSC for controlling rotation speed of the motor 71 based on a torque control signal Vt generated by integral of the charge/discharge pulse current $I_P$ delivered from the charge pump circuit 74 to make DC voltage, and a driver portion 77 which delivers a drive signal D for driving the motor 71 based on the speed control signal VSC. Rotation speed of the motor 71 is detected based on the FG signal FG supplied from a FG sensor 78 via a comparator (not shown), and speed control of the motor 71 is performed by using a result of the detection. It is needless to say that structures and functions (operations) of the rotation speed detection circuit 1 and its structural portions are the same as those of the first and the second embodiments.

The FG sensor 78 has a sensor for detecting rotation speed of the motor 71, and the FG signal FG having the period $T_H$ corresponding to the detected rotation speed in real time is delivered via the comparator (not shown in FIG. 7). As the sensor for detecting rotation speed of the motor 71, an encoder for detecting rotation speed and position of the motor 71 is used. The encoder is a sensor for detecting rotation speed and absolute position of the motor 71 by using a light emission diode (LED) for emitting light and a light receiving element such as a photo transistor for receiving the light from the LED through a positional detection pattern formed on a transparent slit disc fixed to the rotation shaft of the motor 71. Note that the FG sensor 78 such as the encoder is used as the sensor for detecting the rotation speed of the motor 71 in this embodiment, but this embodiment is not limited to this. It is possible to use other sensor (e.g., Hall element) as long as it generates the signal having the period corresponding to the detected rotation speed of the motor 71.

It is needless to say that the period of the FG signal FG obtained from the FG sensor 78 via the comparator (not shown) has a relationship corresponding to the period of the drive signal D for driving the motor 71. In this embodiment, for easy understanding of structures and functions of the speed servo function motor driver 7, the period of the FG signal FG is denoted by the same symbol $T_H$ as that in the first and the second embodiment, and it is supposed that one period of the FG signal FG corresponds to one period of the drive signal D of the motor 71 in the following description. In other words, in the following description, it is supposed that one period of the FG signal FG corresponds to the phase of 360 degrees in the drive signal D. Note that this embodiment is not limited to this limitation. It is sufficient that there is a constant correspondence relationship between the period $T_H$ of the FG signal FG and the drive signal D of the motor 71 (and the rotation speed of the motor 71).

The rotation speed detection circuit 1 receives the FG signal FG supplied from the FG sensor 78 via a comparator (not shown) and detects rotation speed of the motor 71 every one period of the FG signal FG, and further delivers a result of the detection as the L bit digital data signal m-NC. The rotation speed detection circuit 1 includes the edge detection circuit 10, the master clock generation circuit 20, the period divider portion 30 and the internal clock counter portion 2. Note that structures and functions (operations) of the rotation speed detection circuit 1 and its structural portions are the same as those of the first and the second embodiments, so descriptions thereof will be omitted.

Next, the D/A converter 72 performs digital-to-analog conversion of the L bit digital data signal m-NC delivered from the rotation speed detection circuit 1 into the analog voltage signal VC and delivers the same. Here, the voltage value $V_C$ of the analog voltage signal VC indicates a constant value corresponding to the value Cm indicated by the digital data signal m-NC.

The voltage-to-current converter circuit 73 is a circuit for converting the analog voltage signal VC having the constant voltage value $V_C$ delivered from the D/A converter 72 into the analog current signal $I_C$ that is a constant current signal having a constant current value. In addition, the voltage-to-current converter circuit 73 is connected to an end of the resistor R3 disposed outside of the speed servo function motor driver 7. The other end of the resistor R3 is connected to the ground. The analog current signal $I_C$ is a constant current signal indicating a constant current value based on a voltage value of the analog voltage signal VC and a resistance value of the resistor R3 and is delivered to the charge pump circuit 74.

The charge pump circuit 74 receives the input of the analog current signal $I_C$ from the voltage-to-current converter circuit 73 and generates the charge/discharge pulse current $I_P$ corresponding to the analog current signal $I_C$ based on the acceleration control pulse signal AP and the reduction control pulse signal DP delivered from the acceleration/reduction control pulse generation circuit 75 that will be described later. The charge pump circuit 74 is connected to the speed control circuit 76 and is also connected to a lag-lead filter 79 disposed outside the speed servo function motor driver, at a node b between the charge pump circuit 74 and the speed control circuit 76.

The lag-lead filter 79 is a filter circuit which integrates the charge/discharge pulse current $I_P$ delivered from the charge pump circuit 74 to make DC voltage so that the torque control signal Vt is generated. Note that the lag-lead filter 79 is used as a filter circuit for smoothing in this embodiment but this should not be interrupted as a limitation.

The acceleration/reduction control pulse generation circuit 75 generates acceleration control pulse signal AP and the reduction control pulse signal DP which are delivered to the charge pump circuit 74. The pulse signals AP and DP are control signals for quantitatively instructing acceleration or reduction (up/down of the voltage level of the torque control signal Vt) of the motor 71 so that the actual rotation speed of the motor 71 agrees with the target rotation speed, based on the FG signal FG supplied from the FG sensor 78 via the comparator (not shown) and the master clock signal CLK delivered from the master clock generation circuit 20.

The speed control circuit 76 generates a signal related to speed control of the motor 71 based on the torque control signal Vt supplied from the charge pump circuit 74 and delivers the same as the speed control signal VSC to the driver portion 77.

The driver portion 77 generates and delivers the drive signal D for controlling drive of the motor 71 including speed control based on the speed control signal VSC delivered from the speed control circuit 76.

With the structure of the speed servo speed servo function motor driver 7 according to the third embodiment, it is possible to use the analog current signal $I_C$ generated based on the L bit digital data signal m-NC corresponding to the rotation speed of the motor 71 detected by the FG sensor 78 as the charge/discharge pulse current $I_P$ generated based on the acceleration control pulse signal AP and the reduction control pulse signal DP based on the FG signal FG and the master clock signal CLK without using a phase current sensing resistor. Therefore, resolution of speed control gain in the speed controller 76 can be higher, so that stable and more accurate speed control can be performed in accordance with actual rotation speed of the motor 71 (rotation speed of the motor 71 detected by the FG sensor 78) with little influence of switching noise.

In addition, the speed servo function motor driver 7 of the present invention performs the speed control of the motor 71 by the internal clock signal n-$H_C$ obtained by dividing the period $T_H$ of the FG signal FG supplied from the FG sensor 78 via the comparator by n and the digital data signal m-NC based on the internal clock signal n-$H_C$. Therefore, resolution of the speed control gain in the speed controller 76 can be more precise in accordance with the phase (360/n degrees) indicated by the period $T_H$/n, and more accurate speed control can be performed.

Note that the best mode of the present invention is described above, but the disclosed invention can be modified in various way. In addition, it would be obvious to the skilled in the art that various embodiments other than the structures described above can be adopted. Therefore, the attached claims are intended to include every variation of the present invention within the scope without deviating from the spirit and technical view of the present invention.

What is claimed is:

1. A rotation speed detection circuit comprising:
    an internal clock generation portion which receives an input of a period signal whose period varies in accordance with rotation speed of a motor and generates an internal clock signal having a predetermined number of pulses in one period of the period signal; and
    an internal clock counter portion which counts the number of pulses of the internal clock signal for a predetermined period every one period of the period signal and delivers a count value thereof as a digital data signal.

2. The rotation speed detection circuit according to claim 1, wherein
    the internal clock generation portion includes an edge detection circuit which generates a pulse signal corresponding to each period of the input period signal and delivers the same as an edge signal, a master clock generation circuit which generates a master clock signal having a constant frequency, and a period divider portion which generates a pulse signal having pulses of a predetermined number n in which one period is the time obtained by dividing equally one period of the edge signal supplied from the edge detection circuit by the predetermined number n in each period of the edge signal based on the master clock signal and delivers the same as the internal clock signal, and
    the internal clock counter portion counts the number of pulses of the master clock signal supplied from the master clock generation circuit with a trigger signal of the edge signal supplied from the edge detection circuit in each period of the edge signal, counts the number of pulses of the internal clock signal supplied from the period divider portion in the effective count time from an input of the edge signal until an input of a predetermined m-th pulse of the master clock signal, and delivers the count value as the digital data signal.

3. The rotation speed detection circuit according to claim 2, wherein the internal clock counter portion includes an m-counter which counts the number of pulses of the master clock signal with a trigger signal of an input of the edge signal in each period of the edge signal, and delivers an m-gate signal in which the edge signal is a first gate pulse while the counted m-th pulse of the master clock signal is a second gate pulse, and an internal clock counter which counts the number of pulses of the internal clock signal supplied in the effective count time from an input of the first gate pulse of the m-gate signal from the m-counter until an input of the second gate pulse in each period of the edge signal, and delivers a count value thereof as the digital data signal.

4. The rotation speed detection circuit according to claim 2, wherein the predetermined number n is 360 or a multiple of 360.

5. The rotation speed detection circuit according to claim 1, wherein the period signal is output from a Hall element or an FG sensor.

6. A motor driver comprising:
a rotation speed detection circuit;
a lead angle control circuit which outputs a lead angle control signal for performing lead angle control of a motor based on a digital data signal and an internal clock signal;
a driver portion which performs the lead angle control in accordance with rotation speed of the motor based on the lead angle control signal and delivers a drive signal for driving the motor, wherein
the rotation speed detection circuit includes an internal clock generation portion which receives an input of a period signal whose period varies in accordance with rotation speed of the motor and generates the internal clock signal having a predetermined number of pulses in one period of the period signal, and an internal clock counter portion which counts the number of pulses of the internal clock signal for a predetermined period every one period of the period signal and delivers a count value thereof as a digital data signal.

7. The motor driver according to claim 6, further comprising:
a D/A converter which converts the digital data signal having L bits delivered from the rotation speed detection circuit into a first analog voltage signal having a first voltage value;
a voltage-to-current converter circuit which converts the first analog voltage signal into an analog current signal; and
an A/D converter which converts a second analog voltage signal having a second voltage value based on the analog current signal into a second digital data signal having k bits, wherein
the first analog voltage signal is applied to an end of a first resistance element connected to the voltage-to-current converter circuit, so that the first analog voltage signal is converted into the analog current signal,
the analog current signal is applied to an end of a second resistance element, so that the second analog voltage signal is drawn out from the end of the second resistance element, and
the lead angle control circuit generates the lead angle control signal based on the internal clock signal and the second digital data signal.

8. The motor driver according to claim 7, wherein
a resistance value of the first resistance element and a resistance value of the second resistance element are variable, and
a relationship between the first voltage value of the first analog voltage signal and the second voltage value of the second analog voltage signal is determined based on a ratio of a resistance value of the first resistance element to a resistance value of the second resistance element.

9. The motor driver according to claim 8, wherein a relationship between the first voltage value of the first analog voltage signal and the second voltage value of the second analog voltage signal is a linear relationship.

10. The motor driver according to claim 8, wherein a relationship between the first voltage value of the first analog voltage signal and the second voltage value of the second analog voltage signal is a non-linear relationship.

11. The motor driver according to claim 6, wherein the internal clock generation portion includes
an edge detection circuit which generates a pulse signal corresponding to each period of the input period signal and delivers the same as an edge signal,
a master clock generation circuit which generates a master clock signal having a constant frequency, and
a period divider portion which generates a pulse signal having pulses of a predetermined number n in which one period is the time obtained by dividing equally one period of the edge signal supplied from the edge detection circuit by the predetermined number n in each period of the edge signal based on the master clock signal and delivers the same as the internal clock signal, and wherein
the internal clock counter portion counts the number of pulses of the master clock signal supplied from the master clock generation circuit with a trigger signal of the edge signal supplied from the edge detection circuit in each period of the edge signal, and counts the number of pulses of the internal clock signal supplied from the period divider portion in the effective count time from an input of the edge signal until an input of a predetermined m-th pulse of the master clock signal, so as to deliver the count value as the digital data signal.

12. The motor driver according to claim 11, wherein the internal clock counter portion includes
an m-counter which counts the number of pulses of the master clock signal with a trigger signal of an input of the edge signal in each period of the edge signal, and delivers an m-gate signal in which the edge signal is a first gate pulse while the counted m-th pulse of the master clock signal is a second gate pulse, and
an internal clock counter which counts the number of pulses of the internal clock signal supplied in the effective count time from an input of the first gate pulse of the m-gate signal from the m-counter until an input of the second gate pulse in each period of the edge signal, and delivers a count value thereof as the digital data signal.

13. The motor driver according to claim 11, wherein the predetermined number n is 360 or a multiple of 360.

14. The motor driver according to claim 6, wherein the period signal is output from a Hall element or an FG sensor.

15. A motor driver with speed servo comprising:
a rotation speed detection circuit;
a D/A converter which converts the digital data signal delivered from the rotation speed detection circuit into an analog voltage signal;
a voltage-to-current converter circuit which converts the analog voltage signal into an analog current signal;

an acceleration/reduction control pulse signal generation circuit which generates an acceleration control pulse signal and a reduction control pulse signal so that actual rotation speed of the motor agrees with target rotation speed based on the period signal;

a charge pump circuit which generates charge/discharge pulse current corresponding to the analog current signal based on the acceleration control pulse signal and the reduction control pulse signal;

a speed control circuit which delivers a speed control signal for controlling rotation speed of the motor based on a torque control signal generated by integral of the charge/discharge pulse current delivered from the charge pump circuit to make DC voltage; and a driver portion which delivers a drive signal for driving the motor based on the speed control signal, wherein the rotation speed detection circuit includes an internal clock generation portion which receives an input of a period signal whose period varies in accordance with rotation speed of the motor and generates the internal clock signal having a predetermined number of pulses in one period of the period signal, and an internal clock counter portion which counts the number of pulses of the internal clock signal for a predetermined period every one period of the period signal and delivers a count value thereof as a digital data signal.

16. The motor driver with speed servo according to claim 15, wherein the internal clock generation portion includes an edge detection circuit which generates a pulse signal corresponding to each period of the input period signal and delivers the same as an edge signal, a master clock generation circuit which generates a master clock signal having a constant frequency, and a period divider portion which generates a pulse signal having pulses of a predetermined number n in which one period is the time obtained by dividing equally one period of the edge signal supplied from the edge detection circuit by the predetermined number n in each period of the edge signal based on the master clock signal and delivers the same as the internal clock signal, and wherein the internal clock counter portion counts the number of pulses of the master clock signal supplied from the master clock generation circuit with a trigger signal of the edge signal supplied from the edge detection circuit in each period of the edge signal, and counts the number of pulses of the internal clock signal supplied from the period divider portion in the effective count time from an input of the edge signal until an input of a predetermined m-th pulse of the master clock signal, so as to deliver the count value as the digital data signal.

17. The motor driver with speed servo according to claim 16, wherein the internal clock counter portion includes an m-counter which counts the number of pulses of the master clock signal with a trigger signal of an input of the edge signal in each period of the edge signal, and delivers an m-gate signal in which the edge signal is a first gate pulse while the counted m-th pulse of the master clock signal is a second gate pulse, and an internal clock counter which counts the number of pulses of the internal clock signal supplied in the effective count time from an input of the first gate pulse of the m-gate signal from the m-counter until an input of the second gate pulse in each period of the edge signal, and delivers a count value thereof as the digital data signal.

18. The motor driver with speed servo according to claim 16, wherein the predetermined number n is 360 or a multiple of 360.

19. The motor driver with speed servo according to claim 15, wherein the period signal is output from a Hall element or an FG sensor.

* * * * *